Jan. 13, 1942.    D. J. PENTZER ET AL    2,270,138
APPARATUS FOR DEHYDRATING SIRUP OR THE LIKE
Original Filed July 6, 1938    3 Sheets-Sheet 1
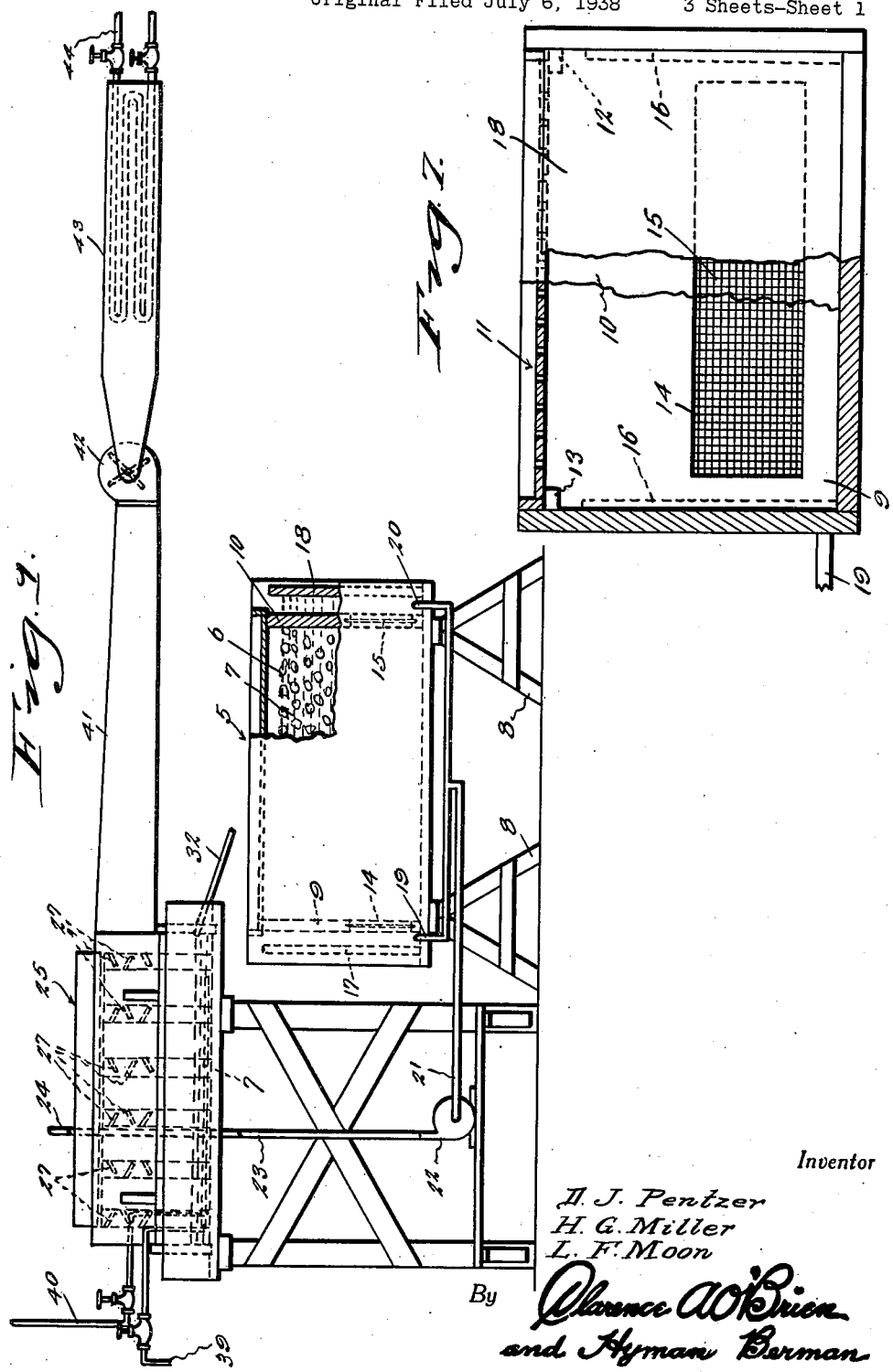
Inventor
D. J. Pentzer
H. G. Miller
L. F. Moon
By Clarence A. O'Brien
and Hyman Berman
Attorneys

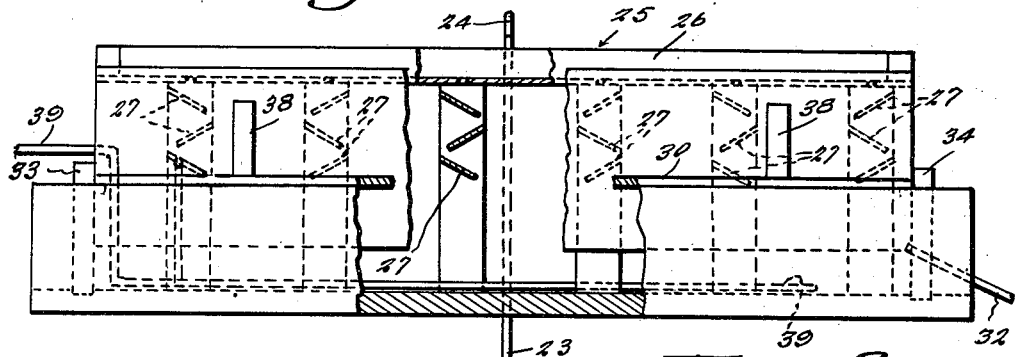
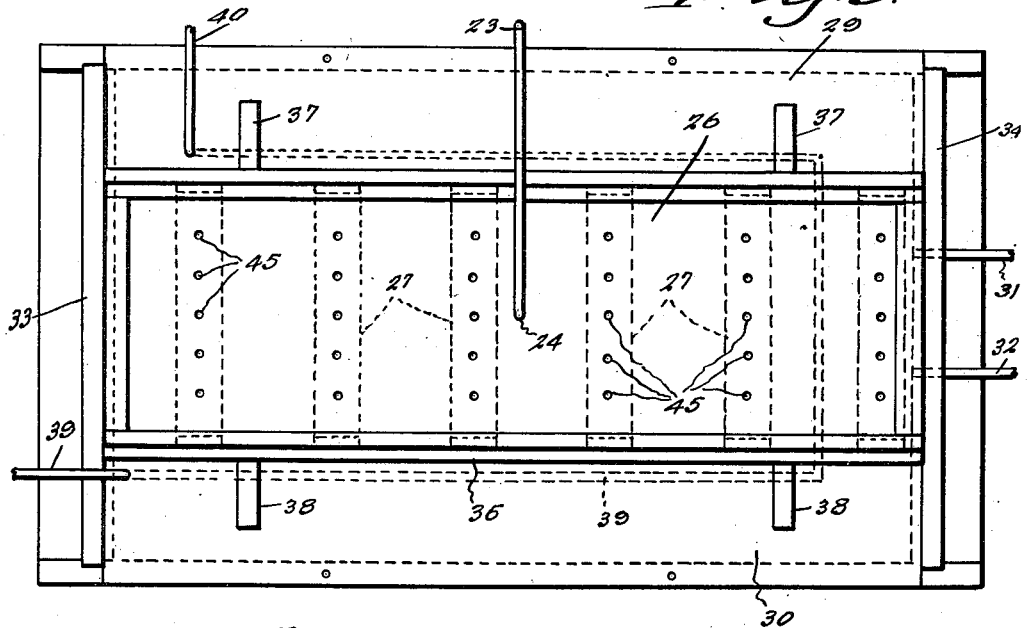
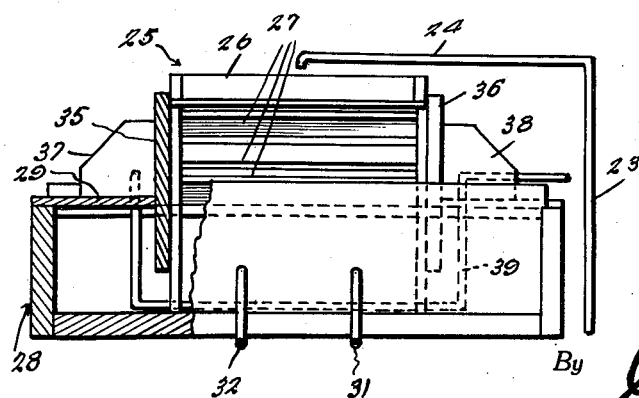

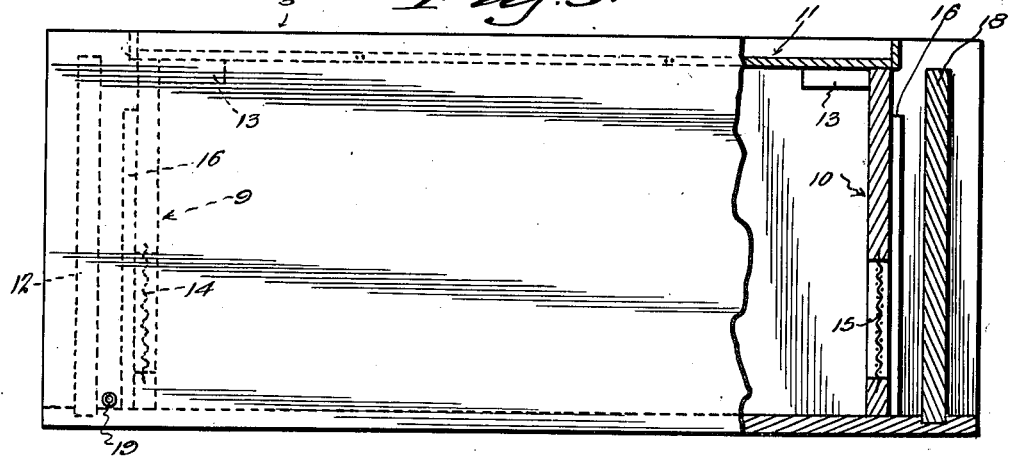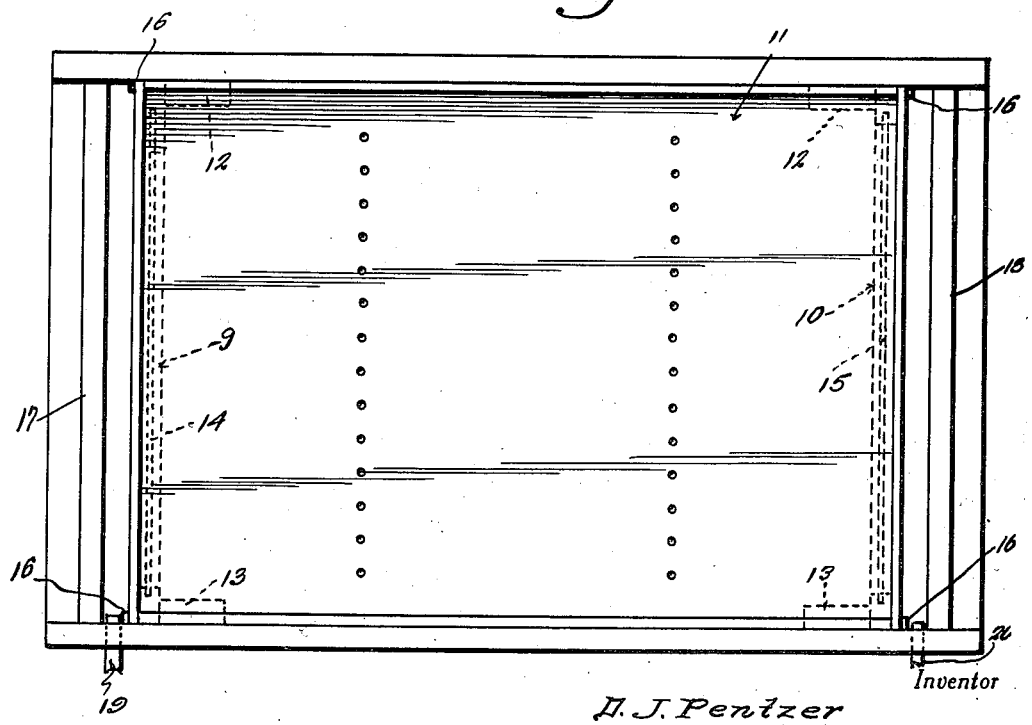

Patented Jan. 13, 1942

2,270,138

UNITED STATES PATENT OFFICE 2,270,138

APPARATUS FOR DEHYDRATING SIRUP OR THE LIKE

Donald J. Pentzer, Herbert G. Miller, and Lee F. Moon, The Dalles, Oreg.

Original application July 6, 1938, Serial No. 217,786. Divided and this application January 27, 1939, Serial No. 253,180

4 Claims. (Cl. 159—13)

Our invention relates to apparatus for increasing the soluble solid content of fruits and vegetables, and an important object of our invention is to provide means whereby fruits and vegetables may be processed, especially in making maraschino and candied fruits and vegetables, whereby superior products of this character are obtained, and greater efficiency and speed in the processing are obtainable with consequent substantial reduction in the expense of working such processes.

Other important objects and advantages of our invention will be apparent from a reading of the following description and drawings, wherein for purposes of illustration we have set forth a preferred embodiment of our invention.

The subject matter of the present application is a divisional application, the subject matter thereof having been divided out of our co-pending application Serial No. 217,786, filed July 6, 1938, and entitled "Process and apparatus for increasing the soluble solid content of fruits and vegetables in making maraschino and candied fruits and vegetables."

In the drawings:

Figure 1 is a side elevational view partly broken away and showing the formation and arrangement of the parts of the present embodiment of our invention.

Figure 2 is an enlarged side elevational view partly broken away and showing the combined evaporating chamber and sirup heating chamber.

Figure 3 is a top plan view of Figure 2.

Figure 4 is an end elevational view partly broken away of Figure 2.

Figure 5 is a side elevational view partly broken away of the fruit holding tank.

Figure 6 is a top plan view partly broken away, of Figure 5.

Figure 7 is an end elevational view partly broken away of Figure 5.

Referring in detail to the drawings, the numeral 5 generally designates a round, rectangular or square tank made of wood, metal, or plastic material suitable to hold the fruits or vegetables 6 and the sirup or other liquid 7. This tank is suitably supported on legs or trestles 8, and is provided interiorly with partitions 9 and 10 spaced from the end walls of the tank and arranged transversely, and supporting a perforated tray 11 in conjunction with cleats 12 and 13 fixed to the upper part of the side walls of the tank. The partitions 9 and 10 have respective screened openings 14, 15, in the lower part thereof. These partitions are held in place by pairs of vertical cleats 16 secured to the opposite side walls of the tank, and the opposite ends of the tank are closed by dams 17, 18, respectively. Outlet pipes 19, 20 lead from the spaces between the partitions and the dams, near the bottom of the tank 5.

A pipe 21 connects with both of the pipes 19, 20 and feeds the intake of a pump 22 which discharges through a pipe 23 which has on its upper end a gooseneck or the like 24 discharging downwardly upon the middle of the distributing tray 26 of the evaporating chamber 25. This tray is supported above tiers 27 of alternately and oppositely declining baffles which rise from the bottom of the sirup heating chamber 28. The tray 26 has holes 45 over each tier of baffles and the tray is only fractionally as wide as the sirup heating chamber, and the plates 29, 30 cover the top of the chamber 28 at the sides of the evaporating chamber.

At an intermediate point above the bottom of the chamber 28, discharge pipes 31 and 32 extend from one end of the chamber 28 and empty into the perforated tray 11 of the tank 5. Partitions 33 and 34 close the ends of the chamber 28 and engage the opposite ends of the evaporating chamber 25, the latter including side walls 35, 36 supported above the bottom of the chamber 28 by chocks 37, 38 attached to the side walls 35, 36, respectively, and resting on the top of the plates 29, 30.

A steam heating pipe 39 enters the chamber 28 through the plate 30 and extends along the bottom, near one side of the said chamber in a longitudinal manner, then crosses over to the opposite side of the evaporating chamber 25, and then extends longitudinally along this opposite side of the chamber, and then returns upwardly through the plate 29 to the valved pipe 40. The chamber 28 may be round, rectangular or square and be made of wood, metal or plastic material, so as to contain a part of the sirup or other liquid contained by the entire system, and this chamber 28 contains the steam coil 39 or other suitable electric or other heating means for heating the sirup or other liquids therein.

A funnel 41 opens onto one end of the evaporating chamber 25 at a point above the heating chamber 28, and an air blower 42, drawing hot air from a heating chamber 43, blows hot air horizontally through the chamber 25 and its tiers of baffles, whereby the sirup falling through the tiers of baffles, is concentrated by the consequent removal of a part of its water content. Steam heating coils 44 or other suitable heating means heat the air heater 43.

Operation

In operation, the fruits or vegetables 6, prepared from the fresh, canned, frozen or brined fruits or vegetables are placed in the large tank 5 and covered with a sirup or liquid 6 of low density or soluble solids. The coils or heating elements 39 of the heating tank are covered with a similar sirup or liquid. The pump or pumps 22 are turned on so that the sirup or liquid is taken continually from the bottom of the tank 5 and circulated to and through the evaporating chamber 25, thence to and through the heating chamber 28 and then return to the top of the first tank 5.

At the same time, the respective steam coils or heating elements 39, 44 are turned on in the air heating chamber 43, and in the sirup or liquid heating tank 28. The blower 42 is also turned on, whereby hot air is forced through the evaporating chamber 25.

As the sirup or liquid circulates through the system, its density or soluble solid content becomes greater and its volume becomes reduced. Periodically throughout the run, more sirup or liquid is added to the system to restore the volume of sirup or liquid to its original volume. The density or soluble solid content of this sirup or liquid should be the same as that of the sirup or liquid within the system at the time the addition is made.

The temperature of the air blowing into the evaporating chamber 25 and the temperature of the sirup flowing over the fruit or vegetable is maintained at the optimum point for the individual variety of fruit or vegetable, by manipulating the valves on the coils or heating elements 44 in the air heating chamber 43 and in the sirup or liquid heating tank 28.

The resultant hot gradually concentrating sirup or liquid, flowing over the fruit or vegetable, heats the fruit or vegetable and penetrates into the flesh of the same, extracting water from the same, and replacing the water thus extracted with sugar or other solid material carried in the sirup or liquid. Thus, the soluble solid content of the fruit or vegetable is gradually increased to the point desired, in a maraschino or candied cherry or other candied fruit or vegetable.

Although we have shown and described herein a preferred embodiment of the apparatus of our invention, it is to be definitely understood that we do not desire to limit the application of our invention thereto, and any change or changes may be made in the materials and in the structure and arrangement of the parts, within the spirit of the invention and the scope of the subjoined claims.

Having described the invention, what is claimed as new is:

1. Apparatus for dehydrating sirup or the like, said apparatus comprising an elongated sirup receptacle having relatively low side and end walls and sirup discharging means, an elongated baffle chamber resting on the bottom of said receptacle, said chamber comprising end and side walls rising above the level of the walls of said receptacle with the sides of said chamber spaced laterally inwardly from the side walls of said receptacle, horizontal panels extending between the sides of the chamber and the tops of the side and end walls of said receptacle and closing the top of the receptacle, a shallow pan supported at the upper edges of the side walls of said chamber and closing the top of the chamber, said pan being formed with transverse rows of perforations, means feeding sirup into said pan, transverse tiers of vertically spaced horizontal staggered baffles under the rows of perforations onto which the sirup falls, means spacing major portions of lower portions of the side walls of said chamber above the bottom of the receptacle and establishing communication between the chamber and the outlying portions of said receptacle, the end walls of said chamber having air passing openings, and means at one end of said chamber for forcing a stream of heated air longitudinally through said chamber and the tiers of baffles therein.

2. Apparatus for dehydrating sirup or the like as recited by claim 1 wherein said sirup discharging means comprises overflow tubes opening through the wall of said receptacle at approximately the level of the upwardly spaced lower portions of the side walls of said chamber.

3. Apparatus for dehydrating sirup or the like according to claim 1 wherein sirup heating conduits extend along and above the bottom of the said outlying portions of said receptacle.

4. Apparatus for dehydrating sirup or the like according to claim 1 wherein sirup heating conduits extend along and above the bottom of the said outlying portions of said receptacle, said heating conduits being located close to the outer sides of said chamber and having a connecting conduit extending across said chamber.

DONALD J. PENTZER.
HERBERT G. MILLER.
LEE F. MOON.